United States Patent [19]

Marit

[11] 3,990,539

[45] Nov. 9, 1976

[54] LUBRICATION MEANS FOR SWING GEAR DRIVE

[75] Inventor: André G. G. Marit, Veisuille, Belgium

[73] Assignee: Caterpillar Tractor Co., Peoria, Ill.

[22] Filed: Jan. 23, 1975

[21] Appl. No.: 543,573

[52] U.S. Cl. ................................ 184/6.12; 74/467; 212/69
[51] Int. Cl.² .......................................... F16N 29/00
[58] Field of Search .................. 212/67, 68, 69, 66; 74/606 R, 462, 413; 184/6.12, 6.2, 6 R

[56] References Cited
UNITED STATES PATENTS

| | | | |
|---|---|---|---|
| 2,796,148 | 6/1957 | Banks | 184/1.5 |
| 3,662,623 | 5/1972 | Lorence | 212/69 |
| 3,811,577 | 5/1974 | Yancey | 212/69 |
| 3,851,731 | 12/1974 | Jorgensen | 184/6.12 |
| 3,854,553 | 12/1974 | Miller | 184/6.12 |

Primary Examiner—Richard C. Pinkham
Assistant Examiner—Marvin Siskind
Attorney, Agent, or Firm—Phillips, Moore, Weissenberger, Lempio & Strabala

[57] ABSTRACT

An excavator comprises an upper unit rotatably mounted on an undercarriage by selectively driving a swing pinion against a reaction ring gear secured to the undercarriage. A semi-cylindrical grease retainer is secured to the upper unit to substantially enclose the swing pinion to continuously supply grease to meshing teeth of the respective gears. A fill-tube is secured to the retainer to communicate grease therein via a fitting disposed in an operator's cab of the excavator.

7 Claims, 4 Drawing Figures

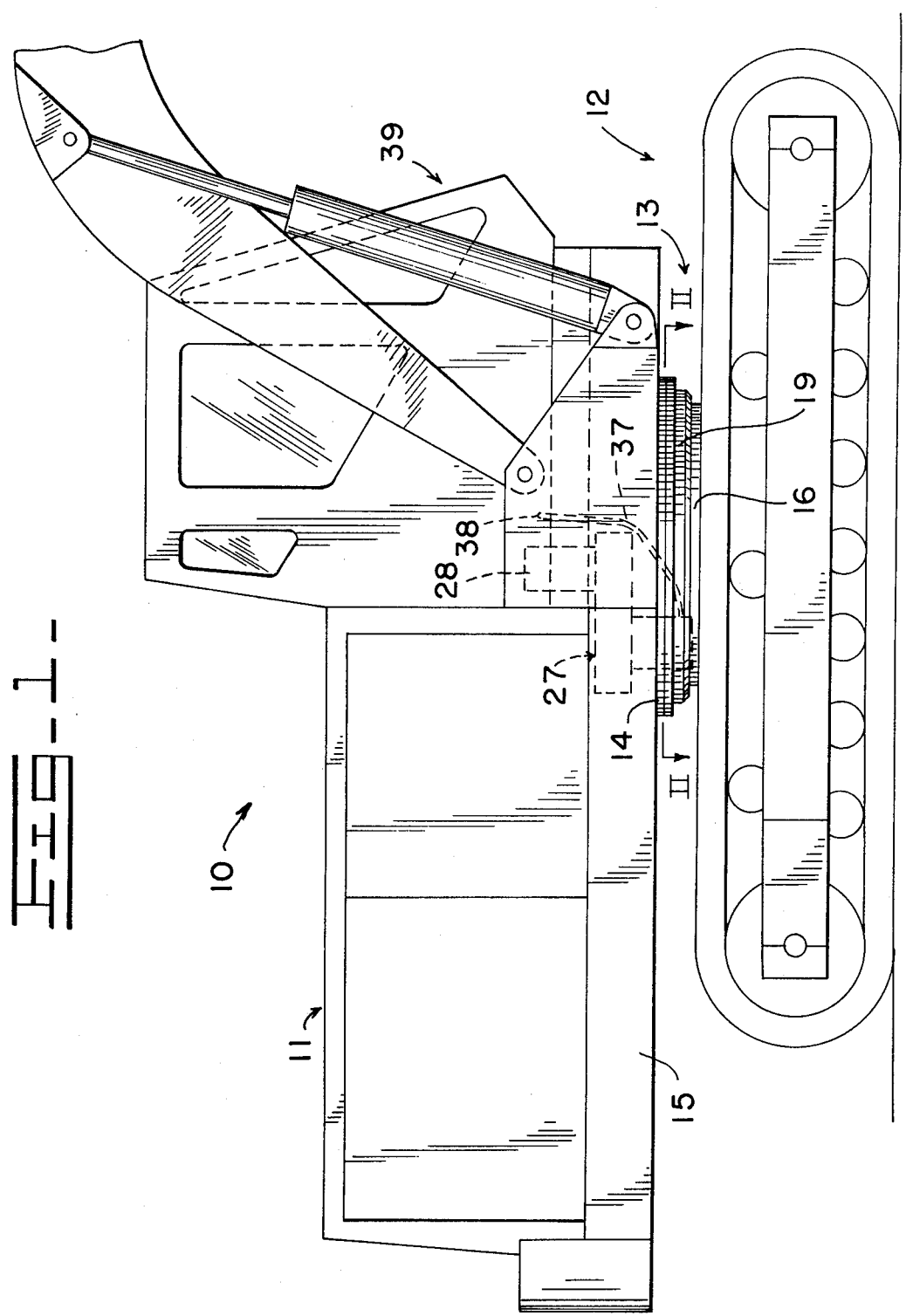

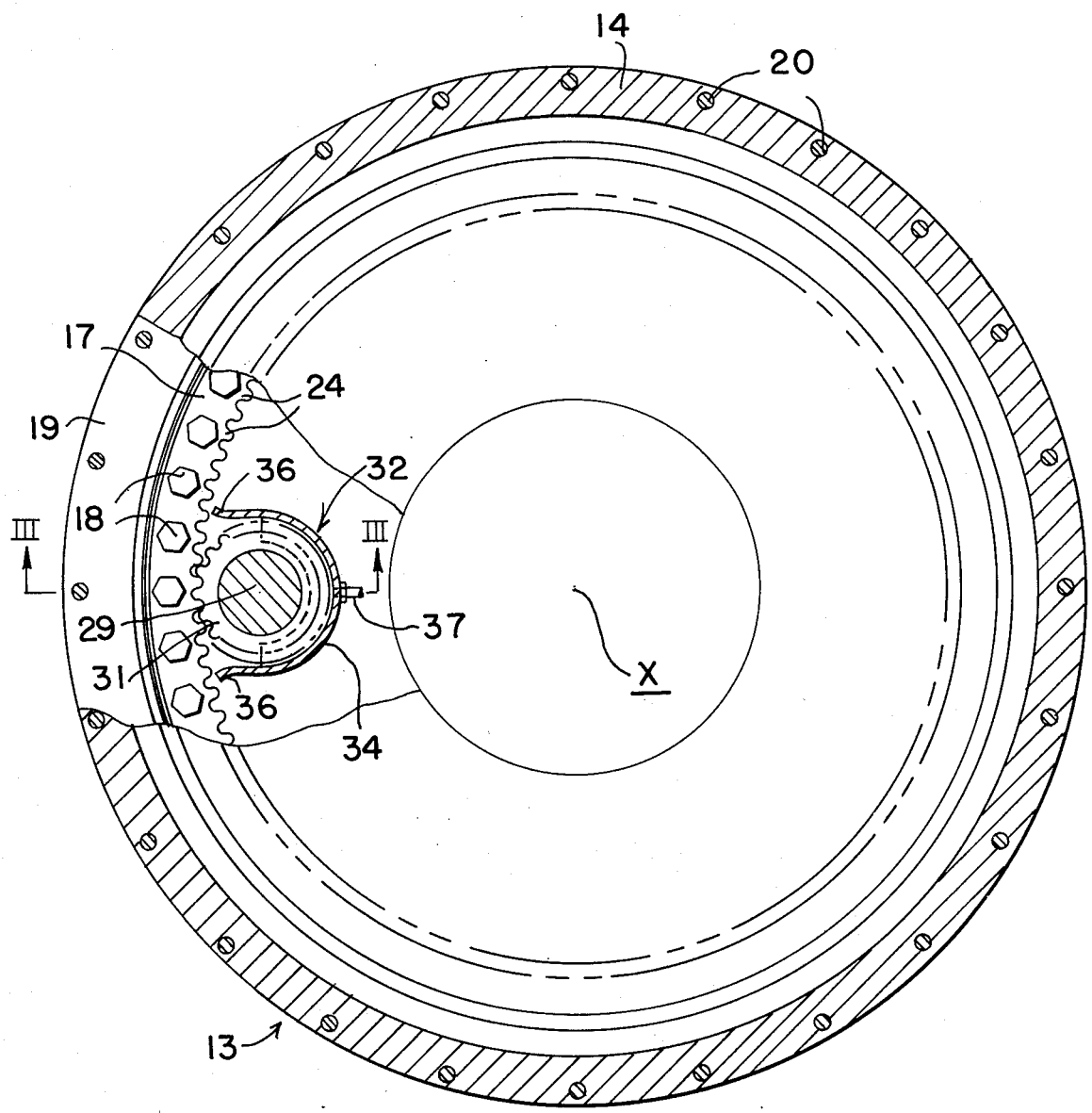
Fig_2_

U.S. Patent  Nov. 9, 1976  Sheet 3 of 3  3,990,539
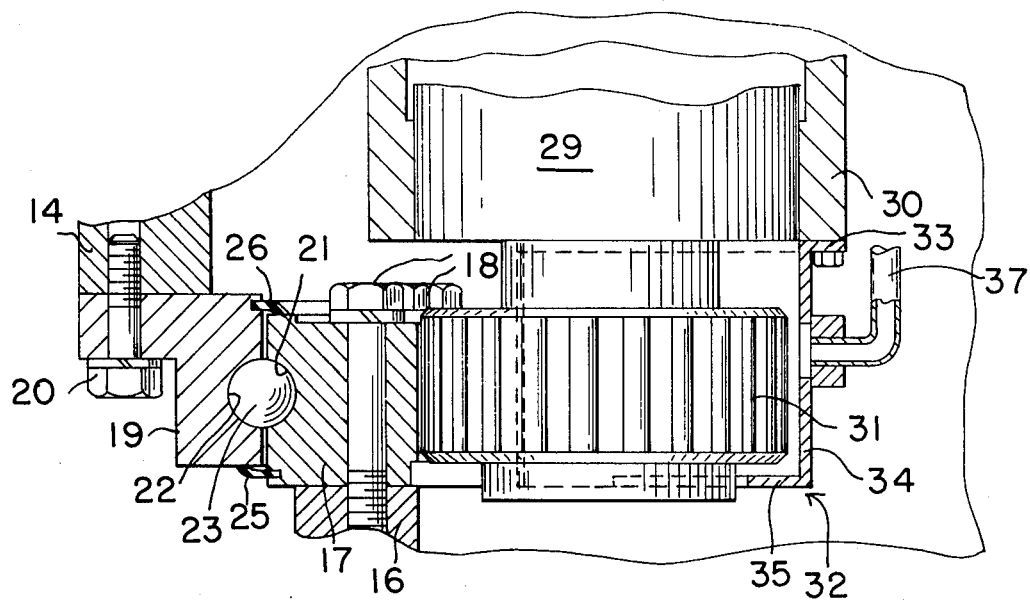
Fig_3_
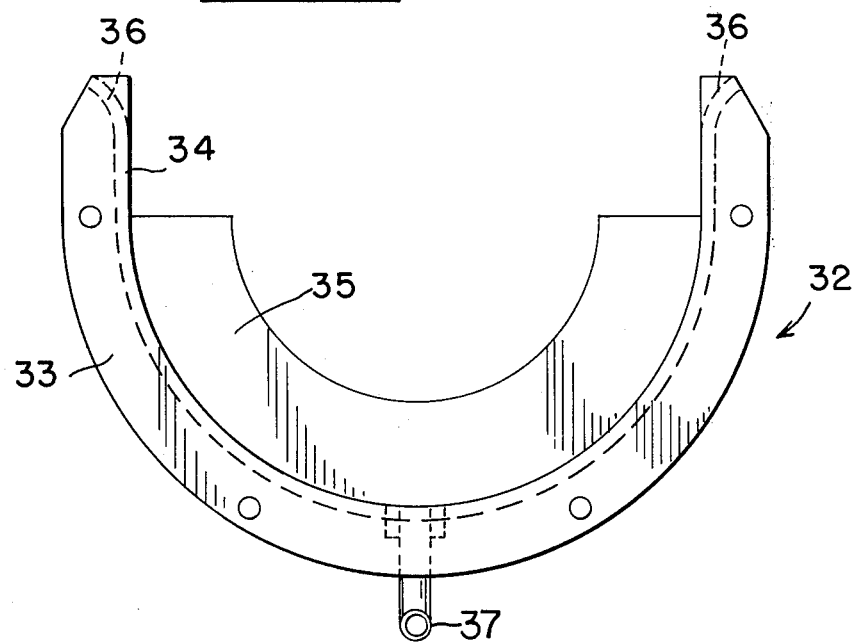
Fig_4_

LUBRICATION MEANS FOR SWING GEAR DRIVE

BACKGROUND OF THE INVENTION

The present invention relates to a lubrication means for continuously lubricating a gear drive mechanism, particularly adapted for use in a hydraulic excavator.

Conventional power transmissions employed in excavators include a motor-driven swing pinion which rotates against a stationary ring gear to selectively rotate an upper unit relative to a mobile undercarriage. The swing pinion and associated ring gear are generally exposed to dust and other foreign matters associated with the operation of the excavator. The swing pinion and ring gear are usually lubricated by applying a heavy grease thereto which tends to leave the meshing teeth of the respective gears during excavator operation. Thus, undue wear of the gears results unless the grease is continuously replaced by a workman.

One solution to this problem may be found in U.S. Application Ser. No. 411,774 for "Lubrication System For Swing Gear Drive," filed on Nov. 1, 1973 by Calvin L. Miller. Such application, assigned to the assignee of this application, teaches the use of a pan for enclosing the ring gear and swing pinion and a pair of wedge-shaped members mounted on either side of the swing pinion to continuously press lubricating grease thereon. Another lubrication system of this general type is disclosed in U.S. Pat. No. 3,811,577, also assigned to the assignee of this application.

OBJECTS OF THE INVENTION

An object of this invention is to provide an economical and efficient lubrication means for a gear drive mechanism, comprising meshing ring and pinion gears, which is adapted to continuously lubricate meshing teeth thereof. The lubrication means comprises a semi-cylindrical retainer substantially enclosing the pinion gear for continuously supplying a lubricant, such as grease, to meshing teeth of the respective gears. In the preferred embodiment of this invention, a fill-tube is secured to the retainer to periodically replenish grease therein from a remote location.

BRIEF DESCRIPTION OF THE DRAWINGS

Other objects of this invention will become apparent from the following description and accompanying drawings wherein:

FIG. 1 is a side elevational view of a hydraulic excavator having the lubrication means of this invention employed in conjunction with a swing gear drive mechanism thereof;

FIG. 2 is an enlarged top plan view of the swing gear drive mechanism and lubrication means, taken in the direction of arrows II—II of FIG. 1;

FIG. 3 is an enlarged sectional view, taken in the direction of arrows III—III of FIG. 2; and FIG. 4 is a top plan view of a grease retainer employed in the lubrication means.

DESCRIPTION OF THE PREFERRED EMBODIMENT

Referring to FIG. 1, an earthworking machine, such as a hydraulic excavator 10, has an upper unit 11 rotatably mounted on a mobile undercarriage 12 by a swing bearing 13. The upper unit includes a mounting ring 14 secured under a frame 15 whereas the undercarriage has a support ring 16 secured thereon. The undercarriage may be mounted on standard, laterally spaced endless tracks.

Referring to FIG. 3, swing bearing 13 includes an inner ring member 17 secured to underlying support ring 16 by bolts 18. The inner ring member is concentrically disposed about a vertically disposed central axis X thereof (FIG. 2) and within an outer ring member 19, attached to mounting ring 14 by bolts 20. The inner and outer ring members are formed with complementary raceways 21 and 22, respectively, which mount bearing means therein comprising a series of circumferentially disposed ball bearings 23 to enable relative rotary movement to occur between the ring members about common axis X.

The inner ring member forms a reaction-type ring gear comprising a plurality of gear teeth 24 positioned to face radially inwardly towards such axis. Annular lip seals 25 and 26 may be secured to the inner and outer ring members, respectively, and are maintained in sliding and sealing contact with the other ring member. The seals cooperate to prevent the entrance of dust and other foreign matter into the raceways and bearings.

Referring again to FIG. 1, a power transmission 27, powered by a hydraulic motor 28, is mounted on the upper unit to selectively rotate the upper unit on the undercarriage. The transmission terminates at a vertically disposed swing or output shaft 29, guided in a cylindrical upper frame support 30, having a swing pinion 31 attached thereto (FIG. 3). The swing pinion is selectively driven against relatively stationary inner ring member or reaction ring gear 17 to effect such rotation.

Referring to FIGS. 2-4, the lubrication means of this invention comprises a semi-cylindrical grease retainer 32 having a radially outwardly extending upper flange 33 releasably attached to an underside of upper frame support 30 by suitably arranged capscrews or the like. The grease retainer further comprises a vertically disposed and semi-cylindrical outer wall 34 and a radially inwardly extending lower flange 35, underlying a substantial portion of swing pinion 31 for grease retention purposes. A pair of flared end portion 36 are formed on the ends of wall 34 to diverge relative to each other towards the ring gear to aid in distributing grease thereon.

Referring to FIG. 1, the lubrication means further comprises a fill-tube 37 having its lower end connected to grease retainer 32 to communicate grease therein (FIG. 3). The upper end of the tube terminates at a zerk fitting 38 or the like. The fitting, adapted for engagement with a conventional grease gun, is disposed at a remote and accessible location in an operator's cab 39 of the upper unit.

I claim:

1. A gear drive mechanism comprising
a horizontally disposed, annular ring gear having teeth formed thereon which face radially inwardly towards a vertically disposed central axis thereof and
a pinion gear mounted for rotation about a vertically disposed axis thereof, parallel to said central axis, and meshing with the teeth of said ring gear, and
lubrication means, including a unitary semi-cylindrical retainer having an open side thereof facing said ring gear and substantially enclosing said pinion gear in close proximity thereto, means for supplying a lubricant to the interior of said retainer to contact with the meshing teeth of said ring and pinion gears, said retainer comprising a semi-cylindrical and vertically disposed sidewall extending at least approximately 180° circumferentially about said pinion gear and a lower flange extending radially inwardly from said sidewall to underlie teeth of said pinion gear.

2. The mechanism of claim 1 wherein said retainer further comprises an upper flange extending radially outwardly from said sidewall and further comprising a shaft, rotatably mounted in a housing, secured to said pinion gear for selectively rotating the same, said upper flange secured to said housing.

3. The mechanism of claim 1 wherein said retainer further comprises a pair of flared end portions formed on the ends of said sidewall to diverge relative to each other towards said ring gear and in close proximity thereto.

4. The mechanism of claim 1 wherein said means for supplying lubricant comprises a fill-tube having its first end connected to said retainer and communicating therein and a second end disposed at a location remote from said gear drive mechanism.

5. The mechanism of claim 4 further comprising a machine including an operator's cab and wherein the second end of said fill tube is disposed in said operator's cab.

6. The mechanism of claim 1 further comprising a construction machine including
   an upper unit having a suppot secured thereunder and an operator's cab secured thereon,
   a mobile undercarriage having said ring gear secured thereto,
   a swing bearing rotatably mounting said support on said undercarriage, and
   a power transmission, mounted on said upper unit, having a vertically disposed swing shaft rotatably mounted therein and said pinion gear attached to said swing shaft and positioned thereon to mesh with said ring gear.

7. The mechanism of claim 6 further comprising a fill-tube having its first end connected to said retainer and communicating therein and a second, fill end disposed in said operator's cab.

* * * * *